(12) United States Patent
Cousineau

(10) Patent No.: US 10,900,179 B2
(45) Date of Patent: Jan. 26, 2021

(54) TIE (SLEEPER) HANDLING AND LIFTING DEVICE

(71) Applicant: Alain Cousineau, Bromont (CA)

(72) Inventor: Alain Cousineau, Bromont (CA)

(*) Notice: Subject to any disclaimer, the term of this patent is extended or adjusted under 35 U.S.C. 154(b) by 606 days.

(21) Appl. No.: 14/399,957

(22) PCT Filed: May 6, 2013

(86) PCT No.: PCT/CA2013/000449
§ 371 (c)(1),
(2) Date: Nov. 9, 2014

(87) PCT Pub. No.: WO2013/166584
PCT Pub. Date: Nov. 14, 2013

(65) Prior Publication Data
US 2015/0108417 A1 Apr. 23, 2015

Related U.S. Application Data

(60) Provisional application No. 61/643,996, filed on May 8, 2012.

(51) Int. Cl.
*B66F 15/00* (2006.01)
*E01B 29/06* (2006.01)
*B65G 7/12* (2006.01)

(52) U.S. Cl.
CPC .............. *E01B 29/06* (2013.01); *B65G 7/12* (2013.01); *B66F 15/00* (2013.01)

(58) Field of Classification Search
CPC ............ E01B 29/06; B66F 15/00; B65G 7/12
See application file for complete search history.

(56) References Cited

U.S. PATENT DOCUMENTS

| | | | | |
|---|---|---|---|---|
| 3,005,651 A * | 10/1961 | Flaker | ...................... | B65G 7/12 294/26 |
| 4,433,829 A * | 2/1984 | Grover | ...................... | B65G 7/12 254/131 |
| 4,991,893 A * | 2/1991 | Gordon | ................... | B66F 15/00 254/129 |
| 5,896,639 A * | 4/1999 | Chen | ...................... | B25B 27/026 29/261 |
| 6,202,985 B1* | 3/2001 | Chong | ................... | B66F 15/00 254/131 |

(Continued)

*Primary Examiner* — David P Bryant
*Assistant Examiner* — Nirvana Deonauth
(74) *Attorney, Agent, or Firm* — Brouillette Legal Inc.; Robert Brouillette

(57) ABSTRACT

A device for lifting and handling steel ties (sleepers) or similar shape ties by the use of one of their top surface holes. The device comprises a straight or angled shape working end to which, on one side, is affixed more or less angularly, an engagement member bearing a recessed area like a notch both inserting and tilting thus locking themselves into aforementioned tie hole so the whole working end can now perform a plurality of operations (lifting, pulling, pushing, rotating and flipping) on the tie being installed or replaced on a railway bed. The other side of the working end is coupled to a straight or angled elongated member, with or without a handle, for manual operations. Alternatively the said other side of working end can be affixed to a variety of coupling member for further integration into a machine for assisted operations.

28 Claims, 8 Drawing Sheets

(56) References Cited

U.S. PATENT DOCUMENTS

| | | | |
|---|---|---|---|
| 6,202,986 B1 * | 3/2001 | Goldman | B66F 19/005 254/131 |
| 7,544,035 B1 * | 6/2009 | Friedrich | B66F 19/005 212/166 |
| 2001/0032972 A1 * | 10/2001 | Fillisetti | B66C 5/025 254/334 |
| 2010/0095499 A1 * | 4/2010 | Hung | B25B 27/026 29/252 |

* cited by examiner

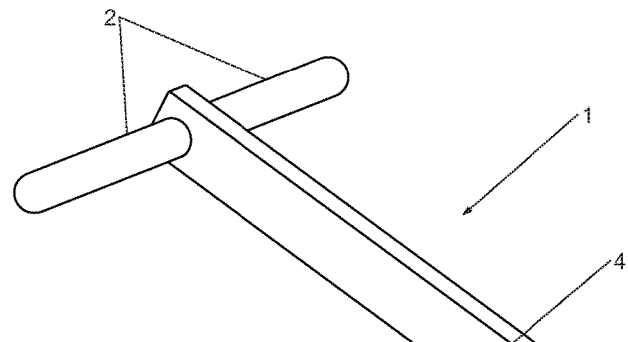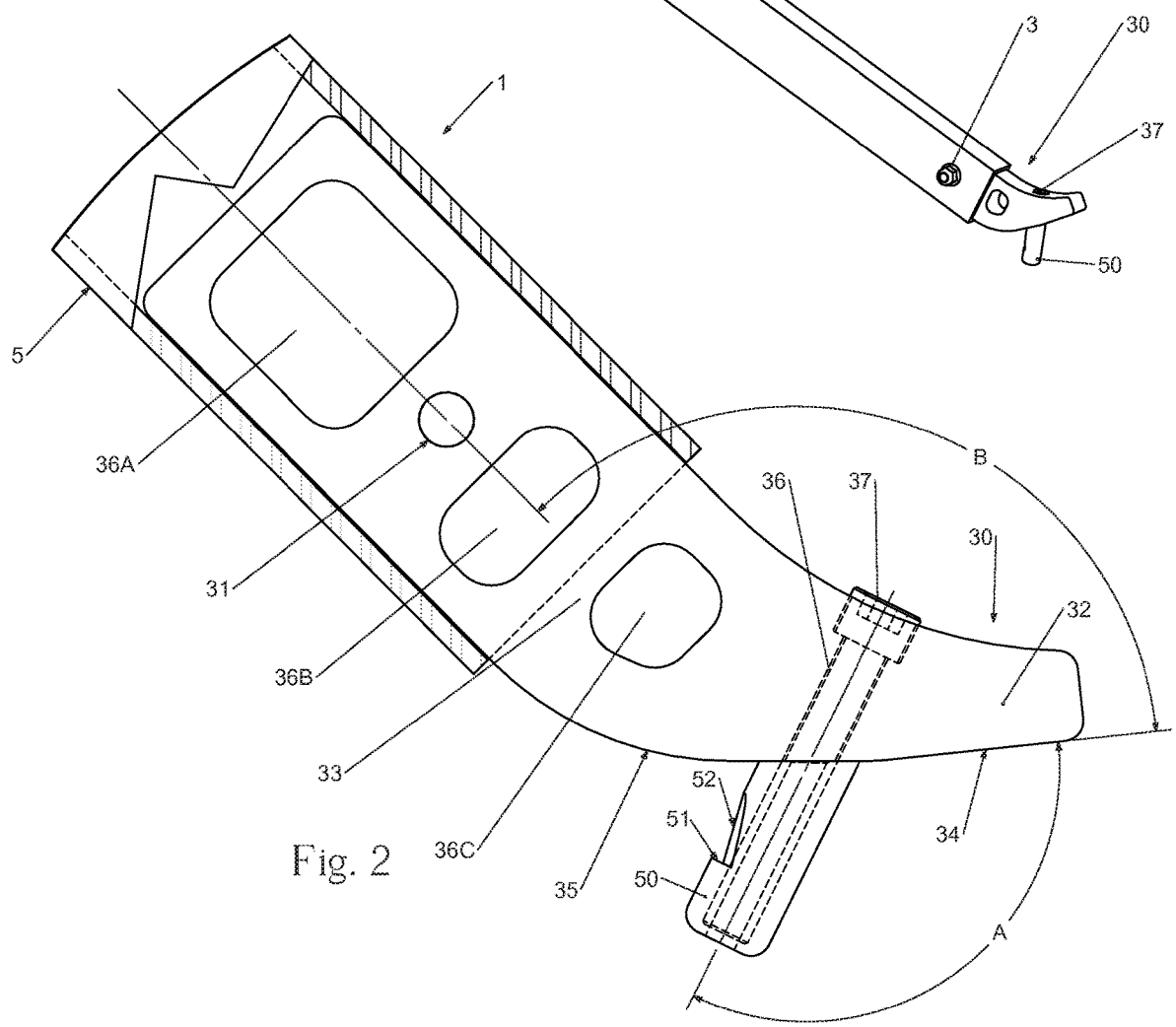

TIE (SLEEPER) HANDLING AND LIFTING DEVICE

CROSS-REFERENCE TO RELATED APPLICATIONS

The present patent application claims the benefits of priority of U.S. provisional application No. U.S. Ser. No. 61/643,996 entitled "TIE HANDLING AND LIFTING TOOL", and filed at the UNITED STATES Patent Office filed on May 8, 2012, the content of which is incorporated herein by reference.

BACKGROUND OF THE INVENTION

1. Field of the Invention

The present invention relates to handling and lifting devices of railway ties (US and Canada), sleepers (Europe) hereinafter called "ties", more specifically ties which comprises holes on their top surface such as steel ties. The present invention allows a worker to execute a plurality of manual operations needed in the installation or replacement of ties such as grabbing, lifting, moving, positioning, rotating or flipping them whether alone or in coordination with another worker. The present invention can be integrated into a machine to perform any number of the above-mentioned operations.

2. Description of Related Art

Historically ties were made of wood for the most part, at least in North America, and wood ties are still representing the larger quantity of installed ties today. Thus, one can imagine the very large offering of tools and machines involved in the installation and replacement of such ties. Over the past decades, developments have been made in material so as to offer alternatives, such as concrete, steel or composite, to name a few, mainly to improve or overcome inherent weaknesses of the wood ties by demonstrating stronger physical attributes and better resistance to decay without the use of harmful or questionable chemicals. Accordingly, new tools and machinery had to be designed to handle those alternate materials. Interest and adoption of concrete ties had grown more rapidly than other alternate material like steel for instance. So had the choice of tools and machines to handle the former. As the interest and adoption of the latter, namely steel, has been much slower the offering of tools and machines has been consequently weaker. Most of the manual tools for handling a steel tie were built to provide solutions adapted to the wood tie world thus proving to be awkward to manipulate with steel ties, due to the major differences in the shape and physical dimensions between both types. No manual tools or devices specifically designed to help in lifting and handling a steel tie has been found.

Hence just looking at the proverbial tong still widely used in manual handling of wood ties and steel ties and shown in U.S. Pat. No. 1,465,892, one skilled in the art could easily notice that the tips of the tong cannot penetrate the steel tie and can only be inserted below the steel tie. Furthermore, neither the tips nor the other parts of the tong which are in contact with the steel tie do not offer any kind of strong holding of the tie, especially when pulling or pushing so as to do the fine positioning of the tie on the railway bed for example. Even then, once the tie is positioned, one has to exert rather strong force and wiggling movement of the tong in order to disengage the tip from underneath the tie laying on the ground. Also, a worker needs to tilt his upper body forward so he can lower the tong enough to fit the tip of the tong underneath the steel tie. That tilted position is much more pronounced than the one required when handling a wood tie so lower back pain are more likely to happen. With wood tie the worker using the tong can pinch the tie at different heights along its vertical walls and stand much straighter. Finally a worker using the tong or similar device has to position himself directly above the area of the tie where the tip of the tong will grasp the tie with each leg on each side of the tie. The worker feet are thus constantly in the area of movement of the tie and prone to being injured. All sorts of tongs exist in all sorts of variations but all having tips meant to penetrate the wood tie results in a poor solution for steel tie in every case for all the same reasons mentioned above.

Some tools or devices, designed for applications outside of the construction and maintenance of railway ties offer solution for similar problems in different fields of invention. However, the all fail to fulfill the required operations and movements without experiencing a problem or another. For example, U.S. Pat. No. 8,029,034 B2 discloses a tool for lifting and moving a car stop which would slip out of the tie hole were it used, among other operations involved in the installation or replacement of railway ties, for pulling and pushing the steel tie. additionally, U.S. Pat. Nos. 7,354,084 B2; 5,137,314 and 3,837,622 all disclose some kind of tool or device for lifting and moving different objects such as flat bottom plate, catwalk grating and manhole cover. They all bear some kind of engagement section equipped with some kind of elongated member and handle. In every case, mainly because of their physical shapes and arrangements, the engagement section cannot perform the aforementioned operations involved in the installation or replacement of railway ties. Among other problems, it cannot be engaged and disengaged into the tie hole into one fluidal movement without interfering with the hole sidewalls thus rendering the execution of the rotation or the flipping of the steel tie impossible.

Moreover, when a person skilled in the art looks at the machines or machinery used in the installation or replacement of railway ties, said person can notice that most of said machines or machinery are not adapted to specifically handle, without any problems, ties which have shapes similar to the steel tie.

Thus, there is a need for a tool or device allowing the lifting and handling of ties made of material differing from wood or having different shapes.

BRIEF SUMMARY OF THE INVENTION

The present invention is a device providing a means to lift and handle a steel tie or a tie with similar shape hereinafter called the tie. The preferred embodiment of the present invention comprises an engagement member designed to be inserted into the ballast inspection hole or the rail clamp adapter hole or any other hole of the tie; a locking member attached to the engagement member and designed to be hooked against the underneath sidewall of any tie hole when the engagement member is tilted; a working end also called a working end assembly comprising a first and second end, to which second end is angularly attached the engagement member, wherein the first end, positioned with an angle with respect with the second end, is adapted to an elongated member comprising a handle. The said angle allows the handle to be grasped by a worker of average height standing upright.

The locking member above-mentioned implemented as a two face notch in the preferred embodiment allows the engagement member to be inserted and locked into the tie hole with one rapid uninterrupted movement without interference with the sidewalls of the hole and also allows the engagement member to be disengaged out of the hole with another rapid uninterrupted without interference with the sidewalls of the hole.

The working end is made of a material strong enough to accommodate weight and forces involved in lifting and handling a tie. As for the engagement member, it is made of a material strong enough to withstand the weight and forces involved in lifting and handling a tie, but is hard enough to resist continuous friction and abrasion against the tie hole sidewalls resulting from its inherent engagement and disengagement movement. The elongated member and the handle are made of a light material to reduce the weight of the device, but the material is strong enough to withstand the weight and forces involved in lifting and handling a tie.

The preferred embodiment as described above allows the execution of any of the operations involved in the installation or the replacement of the tie, such as lifting, pulling, pushing, rotating or flipping back the tie without the working end slipping out of the tie hole for some of said operations nor being stuck into said hole for some other said operations.

Another embodiment of the present invention comprises the same aforementioned working end but shaped flat instead of angled, wherein all other components and characteristics of said working end remain the same, and an elongated member showing an angled end, intended as a fulcrum, resting on the ground. The said angled end is attached to the working end through the use of a pivot member, wherein the other end of the elongated member is long enough to provide the required leverage like a pinch bar, when pushed down, to raise the tie against the rail (nipping) for clamping to the rail or for tamping the ballast under the tie. A further aspect of this embodiment allows the elongated member angled end adapted so it is resting on the rail instead of resting on the ground to act as a fulcrum. The same principle, previously described, of "hooking" the tie by one of its top surface hole is used here in both aspects of the elongated member.

A further embodiment allows the use of a generally similar shape working end previously mentioned, a pivot member that couples the said working end to a plurality of elongated member whether horizontal or vertical, generally straight or not, for further attachment or integration into a machine for example, a tie inserting and extracting machine or a tie laying machine or simply a machine that can move ties with its articulated booms such as a mobile backhoe type, a mobile loader type, a mobile excavator type or the like. One aspect of this embodiment allows the use of at least one actuator for the lowering and raising of the working end with respect to the elongated member. The same principle, previously described, of "hooking" the tie or ties by one of its top surface hole is used by such machines in the presently disclosed other embodiments.

Yet another embodiment comprises two previously mentioned flat working ends, one opposing the other in a mirrored fashion, each reunited and affixed to a mechanical member through the use of a pivot member for further attachment or integration into a machine such as a tie lifting machine or a tie laying machine. It further comprises at least one actuator allowing the lowering and raising of the working end with respect to the mechanical member. That opposing dual working end arrangement is meant to grab the tie by the same principle, previously described, of "hooking" each working end simultaneously into their respective ballast inspection hole or rail clamp adapter hole or any other hole on each end of a steel tie or a tie of similar shape.

The present invention is also providing a method for lifting and handling a tie using a device comprising an engagement member designed to be inserted into one or more hole located on a top surface of the tie, a locking member attached to the engagement member, wherein the locking member is designed to be hooked against the underneath sidewall of any tie hole when said engagement member is tilted and a working end comprising a first and a second end, to which said second end is angularly attached the said engagement member. The method comprises the steps of inserting the device into one of the tie holes, tilting the device until said engagement member is hooked into the sidewalls of said tie hole and moving and handling the tie.

The method further comprises one or more of the followings steps; lifting the device to lift the tie, pulling the device to pull the tie, pushing the device to push the tie and rotating the device to rotate the tie wherein the said steps allows execution of one or more of the following operations upon the tie; picking up a tie from a resting position, moving the picked up tie to a target destination, positioning of the tie at its target destination, flipping an inverted tie to a normal resting position, lifting the tie or one end of the tie against the rail, sliding a tie under an installed rail, picking up a stack of ties and moving the picked up stack of ties to a target destination.

According to an aspect of the above-mentioned method allows for the said operations to performed by a machine.

BRIEF DESCRIPTION OF THE SEVERAL VIEWS OF THE DRAWINGS

The above and other objects, features and advantages of the invention will become more readily apparent from the following description, reference being made to the accompanying drawings in which:

FIG. 1 is a perspective view of the preferred embodiment of the present invention.

FIG. 2 is a partial sectional side elevation view of the working end of the preferred embodiment shown on FIG. 1.

DETAILED DESCRIPTION OF THE INVENTION

Figure 3:
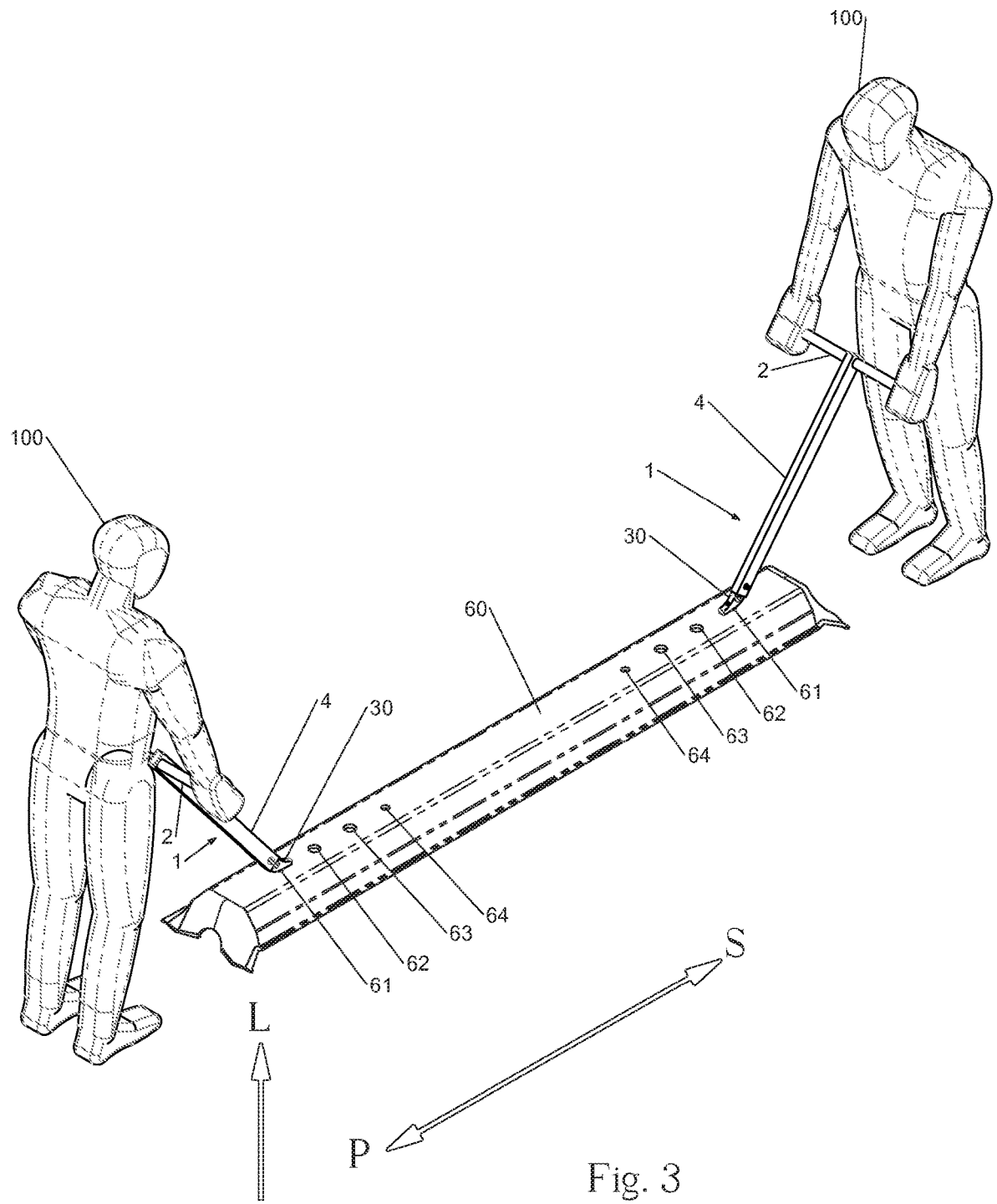
FIG. 3 is a perspective view of workers handling a steel tie with the use of the preferred embodiment.

A novel tie handling and lifting device will be described hereinafter. Although the invention is described in terms of specific illustrative embodiments, it is to be understood that the embodiments described herein are by way of example only and that the scope of the invention is not intended to be limited thereby.

FIG. 1 shows the major arrangement and major components of the preferred embodiment, hereinafter called the device and identified as item 1, namely an elongated straight rectangular extruded aluminum member 4 where at one end a handle, comprised of two identical tubular extruded aluminum rod 2, is soldered perpendicularly to member 4. Into the other end of member 1 is inserted one end of a somewhat angled assembly called the working end assembly 30, or simply the working end 30, of the device 1 and retained by a graded bolt 3 or by any other attachment method. An engagement member 50 is affixed to the other end of the said working end 30 with any attachment method such as a graded cap screw 37.

Member 4 and both tubular sides 2 of the handle have to be strong enough so as not to bend to the point of material permanent deformation under the weight of the steel tie or similar shaped tie (see FIG. 3) being handled or lifted by the device as these components are typically made of extruded aluminum having an empty center or core. For ease of manipulation by the worker and because the device is used for multiple actions needed in the handling and lifting for the purpose of replacing ties or laying down new ties in the maintenance or construction operations in railway, the weight of the device must be as light as possible. To ensure such lightness, the members aforementioned are typically made of aluminum.

Now referring to FIGS. 2 and 3, the working end assembly 30 comprises an angled shape piece made with any solid thick high strength material, such as steel, where one end 33 (also called section) is sized to be inserted into one end of the elongated member 4, the connection is to be secured by the use of any attachment, such as a graded bolt 3. In the preferred embodiment, one skilled in the art would note that bolting, riveting or similar operation is to be used in order to join an aluminum member 4 to a steel member 30 as soldering would not produce a high quality joint. The angle B, as depicted in FIG. 2, in conjunction with the length of the elongated member 4, as depicted in FIG. 3, are both adjusted so the handle 2 can be comfortably grasped by a worker of a standard height having his arms relatively straight and down along his body. Another parameter must be factored in the adjustment of angle B and it consists in making sure that bottom edge 5 of elongated member 4 does not touch the tie underneath side edge 67 as can be seen in FIGS. 6 to 9. That will be discussed in more details further down when modes of operation will be addressed.

As opposed to the elongated member 4 and the handles 2 typical aluminum construction, the working end main body 30 is much heavier because of its hard steel construction and its heavy thickness. Shapes 36A, 36B and 36C represent material removal area intended to reduce weight without altering the required strength of the said working end. To the other end 32 (also called section) of member 30 is attached the engagement member 50. In a preferred embodiment, the attachment is a graded cap screw 37 where said screw is embedded with proper drilling and chamfering shown as area 36 into working end section 32 and threaded all the way through engagement member 50. However, in other embodiment, any attachment mean may be used. Said engagement member 50 is a cylindrical piece made of very hard surface material such as stainless steel so as to resist friction and abrasion of multiple and constant engagement, prying and disengagement into and from the intended tie 60 (FIG. 3) top surface hole whether outer ballast inspection hole 61 (most preferred) or rail clamp adapter holes 62 or 63 or in some cases inner ballast inspection hole 64. That explains why there is a another change of material; going from steel (member section 32) to stainless steel as for the engagement member 50. In other embodiment, the shape of the engagement member 50 may be made different than cylindrical as long as the insertion, tilting, prying and disengagement movement described above and below can still be accomplished as required.

Figure 4:
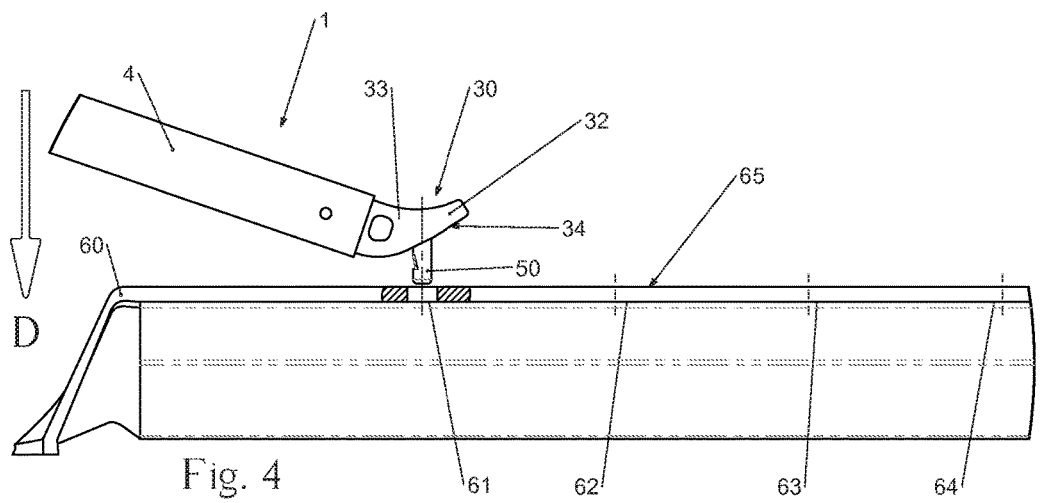
FIG. 4 is a partial sectional side elevation view of the working end of the preferred embodiment being engaged in the top surface ballast inspection hole of a steel tie.
Figure 5:
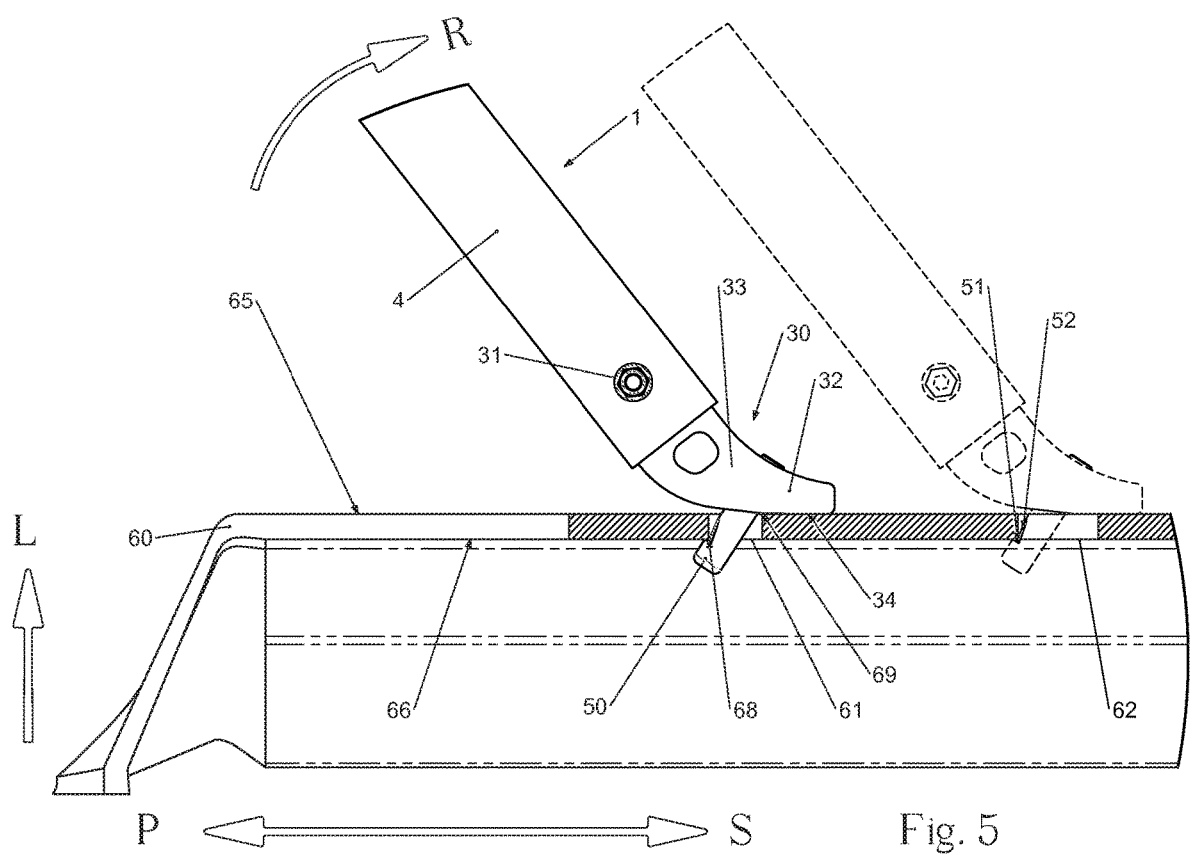
FIG. 5 is a partial sectional side elevation view of the working end of the preferred embodiment completely engaged and locked into the top surface ballast inspection hole of a steel tie normal resting in its normal position. Alternate position of said embodiment shown engaged into other hole of said tie.

Still referring to FIG. 2, the angle A between the engagement member 50 and the underneath surface 34 of working end section 32 is adjusted to facilitate the insertion of said engagement member into any aforementioned tie hole without interference with the sidewalls of the said hole and yet the angle should be slanted enough to reduce the amount of tilting needed to hook and lock the engagement member into the sidewalls of the tie hole for the device 1 to perform the lifting and handling of the tie 60. The said movement of hooking and locking the engagement member into the tie hole is further accomplished by the locking member, represented in this preferred embodiment by the notch faces 51 and 52. Said notch faces are the results of removing material from the cylindrical engagement member 50. One skilled in the art should understand that the said notch faces 51 or 52 shall be large enough to act as a stopper to prevent undesired disengagement of the whole working member 30. In this event, it means slipping out and upwardly from the ballast inspection hole 61, as shown in FIGS. 4 and 5, for example when a worker pull the device 1, thus the tie 60, towards him or push the said tie away from him without lifting it. The hard surface material of engagement member 50 against the almost as hard sidewall of a tie top surface hole (61 to 64) make the contact between both very "slippery". Inversely, the aforementioned notch faces 51 or 52 must be made small enough and not protruding out of the outline of the shape of the engagement member 50 so it does not interfere with the rapid minimal disengagement movement required for some mode of operations which will be addressed below.

Now referring to FIGS. 3, 4 and 5, the preferred mode of operation of the preferred embodiment is depicted. One skilled in the art shall understand that moving a tie typically requires at least two workers, each one of them connecting its own device 1 with his respective end of the tie 60, as shown in FIG. 3. In most instances, an outer ballast inspection hole 61 is used since its position is best located for the worker to be operating away from the said tie thus free to move without endangering parts of his lower body. In some other instances, a rail clamp adapter hole 62 or 63 might be used in absence of ballast hole 61. An inner ballast hole 64 might also be used in some operations involved with sliding the tie 60 under an existing rail for replacement purpose of the said tie. In coordination, workers can then help each other to whether lift tie 60 (movement L) and then transport it over the bed at its intended location. Finally, the workers may lower the tie down on the bed. The lifting movement L only requires the legs of each worker. In this event, each worker bends his knees, straightens his legs with his back straight and lowers the tie 60 back, requiring the bending of his knees again. At that stage, final positioning movement of longitudinal push P or longitudinal pull L without barely lifting it L is occurring. Doing so requires movement coordination from both workers and while one wishes to pull towards him the other helps in pushing towards the other. Both movements are made possible because of the special design of engagement member 50 (FIG. 4) that allows a solid connection with the ballast hole 61 which will prevent the unwanted disengagement of the working end 30 out of the said ballast hole, whether for the worker who is pushing or for the worker who is pulling. It is worth mentioning that since most of worker's movements are performed with their back straight, it is less tiring and much safer for the back than any other manual tie handling device or tool.

Referring to FIG. 4, connecting the working end 30 with the tie 60—starts with lowering said working end (movement D) while aligning and inserting its engagement member 50 rather perpendicularly into the ballast hole 61. The movement D is executed prior to inserting the engagement member 50 into one of the holes. Said lowering (movement D) allows the engagement member 50 to be inserted substantially perpendicular to the top surface 65 of the tie 60 into one of the holes 61 located on the top surface 65 of the tie 60 Once bottom surface 35 of working end 30 reaches top surface 65 of tie 60 the next movement involved can be viewed in FIG. 5. It shows that rotation R of the whole device 1 results in tilting working end 30 with the tip of end section 32 resting on tie top surface 65. Rotation R will stop when notch faces 51 and 52 reaches the under and outer edge 68 of the ballast inspection hole 61 while the top of engagement member 50 simultaneously reaches the upper opposite edge 69 of the ballast inspection hole 61 or the tip of end section 32 bottom surface 34 hits the tie top surface 65, whichever comes first, hence solidly locking the engagement member 50 in. The device 1 is then solidly joined to the tie 60 enough so it can be lifted (L) and handled according to the needs of picking up said tie, moving and laying it down on the ground for further final positioning at its target destination. Disengaging the device 1 is simply accomplished by slightly pushing the handle 2 downward thus rotating the engagement piece 50 so as to bring it back approximately perpendicular to the ballast inspection hole 61 therefore becoming free to be pulled out of the said hole.

End section 32 of working end 30 is mostly needed as a support and stop point after rotation, as described above, almost only when the working end 30 is inserted into a larger hole such as the rail clamp adapter hole 62 or 63 of tie 60 when smaller ballast inspection holes 61 or 64 are non existent for example. In that case of larger said holes, the engagement member 50 diameter would be so small in comparison that when vertically tilted across said larger holes, it would not "squeeze locked" itself against both opposite side walls of said holes as it is the case for smaller ballast inspection hole 61.

Figure 6:
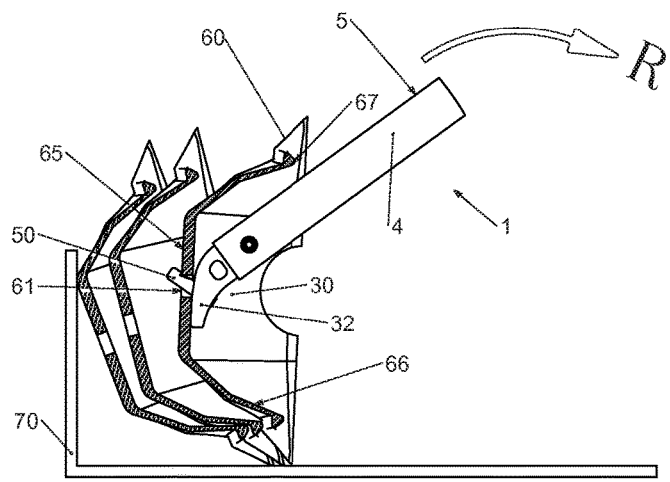
FIG. 6 is a partial sectional side elevation view of the working end of the preferred embodiment completely engaged and locked into the top surface ballast inspection hole of a steel tie (shown from on end) laying on its side in its supply stack. It is the first position in the movement sequence of accessing the said tie from its underneath for the purpose of picking up, extracting from the supply stack and moving the said tie to its final destination.
Figure 7:
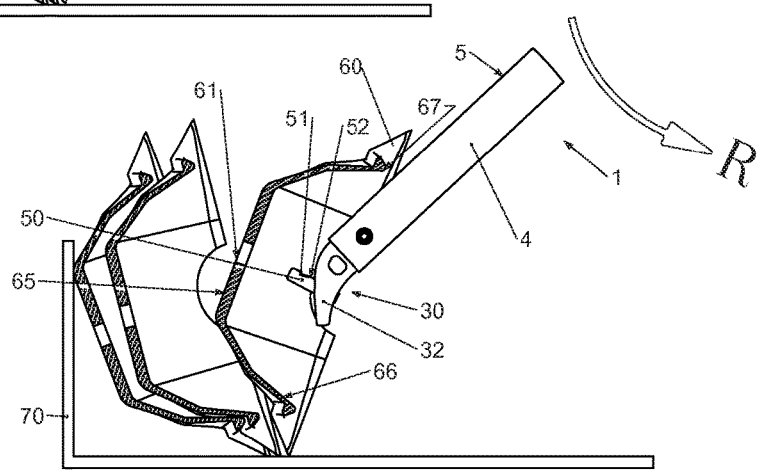
FIG. 7 is a partial sectional side elevation view of the working end of the preferred embodiment in an intermediate position in the movement sequence started in FIG. 6 where the working end of the preferred embodiment is almost disengaged and is starting to free fall while the steel tie is continuing its rotational free fall down.
Figure 8:
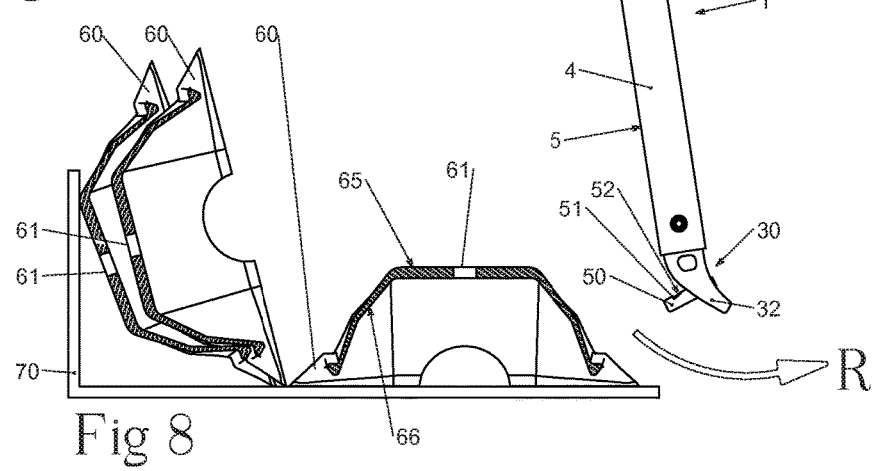
FIG. 8 is a partial sectional side elevation view of the working end of the preferred embodiment in the final position in the movement sequence started in FIG. 6 where the working end of the preferred embodiment is now completely out of the way and the steel tie is resting in its normal position while it awaits picking up from its top surface to be moved to its final destination.

Even though the preferred method of use of the preferred embodiment relates to handling and lifting and moving a tie as described earlier in order to pick it up from its resting place and laying it down at its intended location on the bed of the railway under maintenance or construction, FIGS. 6, 7, and 8 shows other operations offered by the preferred embodiment. It's worth mentioning that the said operations are all performed by only one worker. It is encountered when a worker picks a new tie form the supply stack resting on its side on the forks 70 of the transport machine bringing it to the operation theatre. One worker inserts the engagement member 30 in the ballast inspection hole 61 or similar hole, from under the tie 60, while doing so positions the elongated member 4 vertically and perpendicularly to the said tie and locks the engagement member 50 into hole 61 exactly as it is done from the top surface 65 and as described earlier in the preferred mode of operation. Referring to FIG. 6, the particular shape of working end 30 exhaustively described hereinabove is also designed so the bottom surface 5 of elongated member 4 does not interfere with contact point 67 of the underneath surface 66 of tie 60 when the working end 30 is securely locked into ballast inspection hole 61. From there the worker is ready to perform a downward rotation R by giving a kind of a shove performed in one rapid fluidal movement. This movement will disengage the worked upon tie 60 from its neighbour and rotate it back on the transport forks in the right position with its top surface 65 facing up.

While the said tie is rotating laterally on one of its side, FIG. 7 shows an intermediate position of the said tie where the working end 30 is starting to disengage itself out of ballast inspection hole 61. Mainly because of the initial firm impulse imparted by the worker the working end 30 tends to accelerate its rotating speed over that of tie 60 and, at some point in the tie trajectory, the engagement member 50 will tilt and free itself out of the said hole. The working end 30 will be carried out of the way by the momentum and tie 60 will continue its rotating journey back to its normal resting position, top surface 65 facing up as shown by FIG. 8, ready to be picked up normally and moved to destination. Without the present preferred embodiment, these operations just described are performed using hands or a combination of a pinch bar and hands . . . hence awkwardness, multiple separate operations and potential injuries . . . and most of the time needs two (2) workers as opposed to only one worker when using the preferred embodiment.

Figure 9:
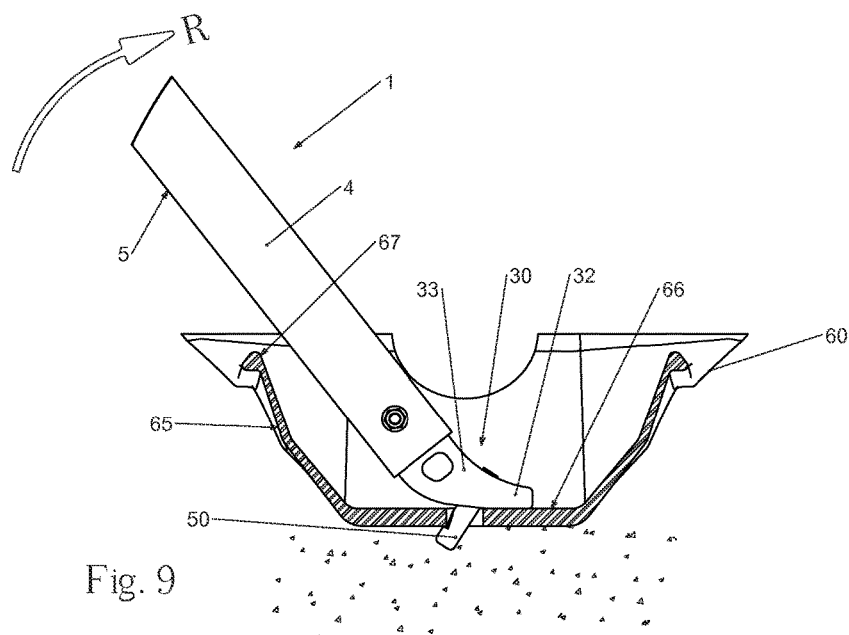
FIG. 9 is a partial sectional side elevation view of the working end of the preferred embodiment completely engaged and locked in the underneath surface ballast inspection hole of a steel tie (shown from one end) laying on a surface with its underneath showing up (upside down) ready to be flipped over so it can be put back in its normal resting position. It involves a sequence similar to the sequence shown in FIGS. 6, 7 and 8.

A variation of the operations above-mentioned in relation to FIGS. 6, 7 and 8 is presented in FIG. 9. The device 1 can be used to rotate back to its normal resting position a tie which is laying down inverted on the ground or any other surface. This becomes useful because when manipulated, the tie tends to easily fall on its face with the underneath face showing up (inverted) due to its particular shape. Doing so involves the same sequence of movement as previously described in relation to FIGS. 6, 7 and 8 with the difference consisting in the starting position of the tie only. Without the present preferred embodiment, that operation just described is performed using hands . . . hence awkwardness and potential injuries . . . and most of the time needs two (2) workers as opposed to only one worker when using the preferred embodiment.

Figure 10:
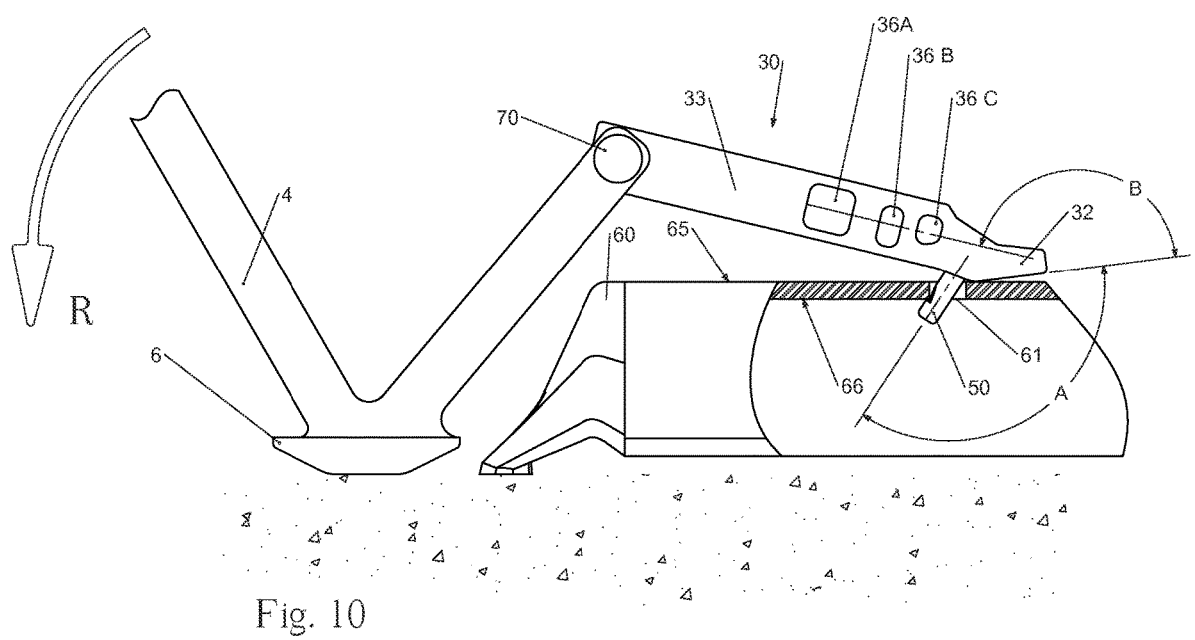
FIG. 10 is a partial sectional side elevation view of another embodiment of the present invention where the stretched version of the working end is completely engaged and locked in the top surface ballast inspection hole of a steel tie which is awaiting to be raised against the rail for clamping to the rail of for tamping of the ballast underneath. This arrangement use the ground as the fulcrum for the raising movement.

Another embodiment of the present invention is shown in FIG. 10. It is comprised of the same working end 30 as the preferred embodiment but with angle B opened towards approximately 180 degree instead of the more closed angle B depicted earlier in the preferred embodiment description, said working end having its section 33 stretched so as to clear the end of tie 60 when properly locked in hole 61 or any other hole, a pivoting member 70 that couples one end of section 33 to elongated member 4, said elongated member is based on a pinch bar but having a V shape with a tip 6 at the end closer to section 33. The said tip of elongated member 4 is shaped to facilitate its resting on the ground where it is acting as a fulcrum. The basic intrinsic functions of working end 30 remains exactly as those described earlier in the preferred embodiment discussion. It must be lowered so engagement member 50 inserts itself into ballast inspection hole 61 and then tilted so said engagement member locks itself into the said hole. That said tilting comes from the downward rotation R of elongated member 4 which results in raising the end of section 33 coupled to member 4 thus finally tilting working end 30 and locking it into ballast hole 61. At that point in the sequence, continuing the downward rotation R will result in lifting the tie 60 until its top surface 65 hits the bottom of the rail (shown in FIG. 11) so it can be clamped to the said tie or until said tie is high enough above ground so tampering of ballast underneath is made possible. Usually, manually raising the tie against the rail is performed by a manual tool called "nipper" that comprises a pinch bar having a plate end or a finger end or a fork end that needs to be inserted underneath the tie end before the completion of its nipping movement by pushing down on the long said pinch bar which has, on one end, a ground support acting as a fulcrum. Conventional tie nipper has to be inserted underneath the tie, wood tie originally, then their plate, finger or fork end has to be raised under the tie, but it is very inconvenient to do on a steel tie or ties of similar shape because of their hollow underneath. A tie nipper grasping the steel tie 60 by its top surface 65 offers a much easier nipping operation and requires less energy from the user, since no insertion underneath the tie is needed.

Figure 11:
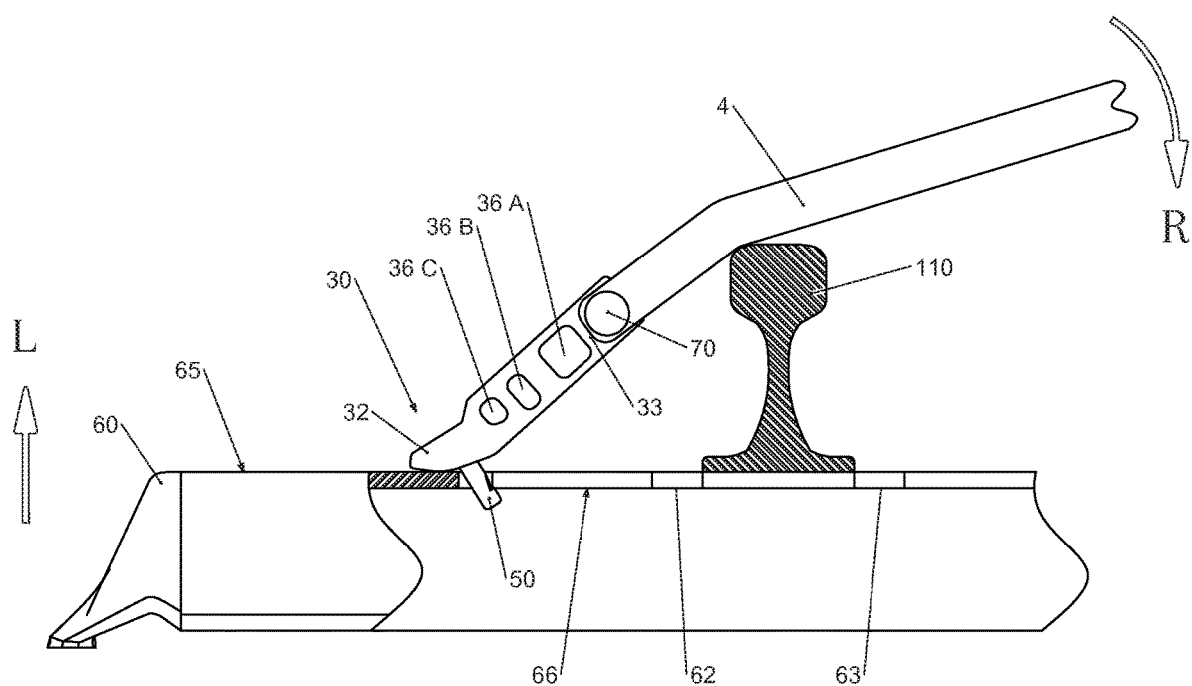
FIG. 11 is a partial sectional side elevation view of another embodiment of the present invention where the same working end is completely engaged and locked in the top surface ballast inspection hole of a steel tie which is awaiting to be raised against the rail for clamping to the rail of for tamping of the ballast underneath. This arrangement use the rail as the fulcrum for the raising movement.

Another embodiment performing the above-mentioned operation of raising the tie like a nipping operation, is depicted in FIG. 11 and is comprised of the same working end 30 but with a shorter normal section 33 of said working end instead of the stretched version discussed previously in relation to FIG. 10. Same pivoting member 70 couples one end of section 33 to elongated member 4, said elongated member resembling a pinch bar but having an angled shape towards its end that is closer to section 33. The engagement and locking into ballast inspection hole 61 of said working end is again performed like the engagement operation of previous embodiment described in relation with FIG. 10. Basically, the difference resides in the chosen fulcrum position being located on top of rail 110, instead of the ground, for the downward rotation R of elongated member 4. The said rotation R results in raising tie 60 against rail 110 for clamping purposes or ballast tamping.

Figure 12:
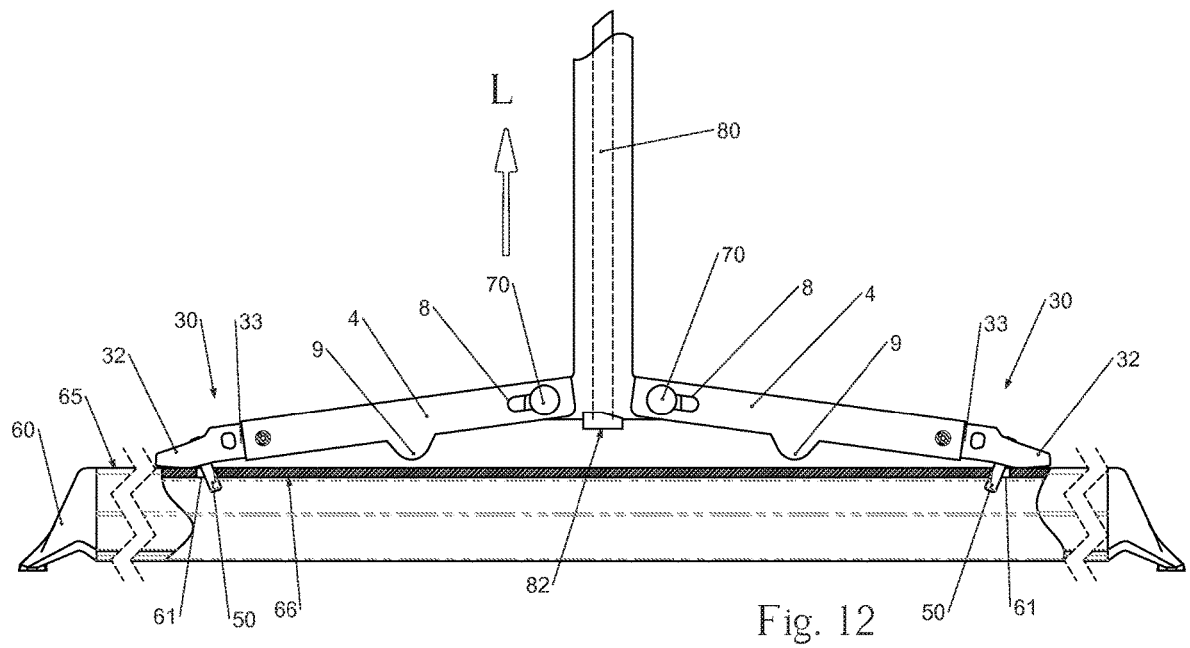
FIG. 12 is a partial sectional side elevation view of another embodiment of the present invention where two working ends are ultimately connected to a single vertical member and said member integrated into a lifting machine or a tie laying machine. The working ends are shown completely engaged and locked in their respective top surface ballast inspection hole of a steel tie which is awaiting to be lifted and moved.
Figure 13:
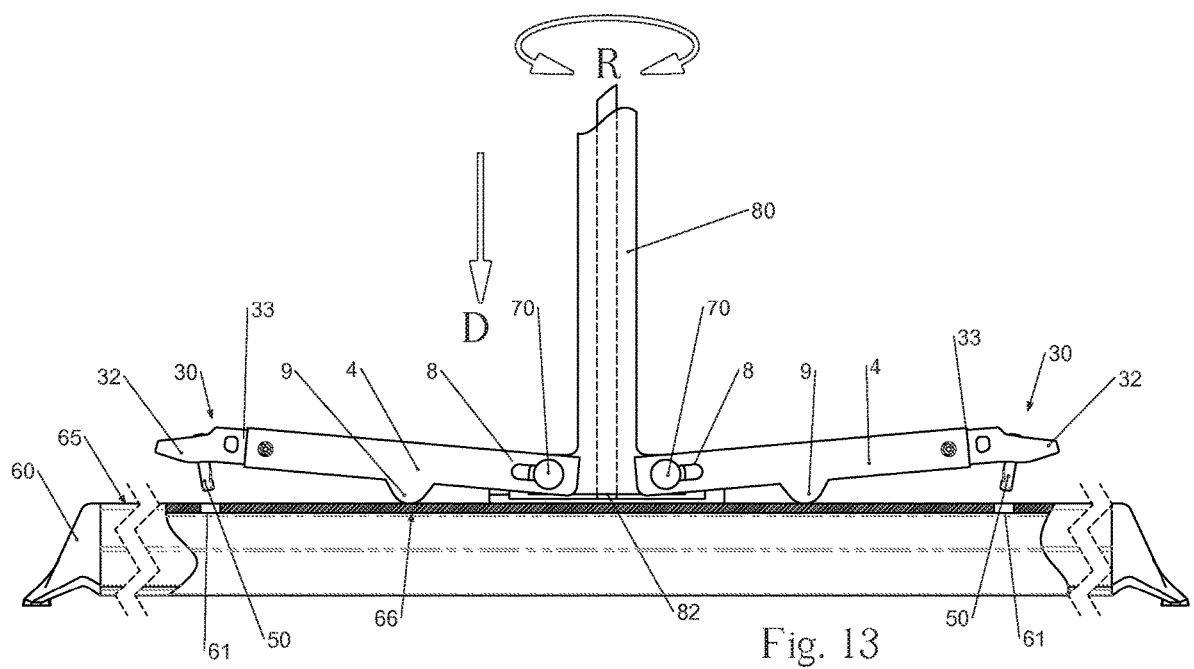
FIG. 13 is a partial sectional side elevation view of the embodiment shown in FIG. 12 in its lowered and disengaging position.

Yet another embodiment featuring the working end 30 that is part of previously detailed embodiments is being presented hereinafter in relation with FIGS. 12 and 13. Specifically, FIG. 12 shows the use of two (2) identical previously described flattened working end 30 of previous embodiment, each affixed to their respective elongated member 4, both resulting assembly facing each other in a mirrored way. Alternatively, said elongated member can be replaced by stretching the section 33 of working end 30 to match the length of said replaced elongated member. The following description relates to the version using an elongated member 4 as illustrated in FIGS. 12 and 13 and can be directly applied to the aforementioned alternate stretched version of working end 30 interchangeably. The farther end of both elongated member 4 are linked together through an horizontal pivot member 70 to which is affixed a mechanical member 80, which in turn is attached or integrated into a tie lifting machine or a tie laying machine, not shown. Each elongated member 4 bears a longitudinal slot 8 in its end into which pivot member 70 can horizontally slide when the whole apparatus is lowered as seen in FIG. 13. Referring back to FIG. 12, both working ends 30 are shown in their completely engaged and locked position (previously detailed in preferred and other embodiments description) into ballast inspection hole 61 ready to lift (towards L) the tie 60 for further move and final positioning to its final target destination. The apparatus described above can be adapted so both working ends 30 are using larger rail clamping adapter hole 62 or 63 (see FIG. 3 for complete holes location).

The goal of the above-mentioned other embodiment is to offer a replacement of the tie grasping device of the said tie lifting machine or said tie laying machine. Said machines usually works with a clamp type device to grasp the wood or concrete tie whether by clamping the said tie by its lateral faces or by its end faces on the longitudinal axis. The fact that steel ties have sloped side or end faces, have much thinner sides or ends than wood or concrete tie and are stored stacked one above another, leaves little room to grasp the top tie by its lateral faces or end faces without also grasping its neighbours just below. Consequently that operation can be easily executed by the use and incorporation of the presently discussed working end 30 type device on the machine. Thus, the tie will be "hooked" from above by its top face through the use of a ballast inspection hole 61 or similar hole, the same way the previously described preferred embodiment does it, whether the tie is stored alone or stacked on top of a pile of others while waiting in the machine prior to being accurately positioned and laid down on the railway bed. The whole stack of stored ties can also rest horizontally in the machine as long as ties are all resting on their lateral side, like the arrangement seen in FIG. 6. The whole apparatus can operate horizontally instead of vertically as shown in FIG. 12. Once the said tie is lowered down into position, this above-mentioned embodiment is now resting in the position shown in FIG. 13. Lowering down (along movement D) the mechanical member 80 is simultaneously tilting both working ends 30 because their respective elongated member 4 is tilting on its pivot member 9. Consequently, each engagement member 50 free themselves of the sidewalls of their respective ballast inspection hole 61 and can then be lifted out and away from tie 60 for pickup and positioning of other ties. Prior to lifting, the vertical elongated member 82 which is inside the mechanical member 80, is to be rotated 90 degrees so its lower end can support and maintain horizontally both elongated member 4 so ultimately both engagement member 50 will stay free of ballast inspection hole 61. Once free the whole apparatus is moved away to be lowered again for further insertion into ballast inspection holes 61 of the next tie 60 as shown in FIG. 13. Vertical elongated member 82 is rotated back 90 degrees rotating its horizontal arms out of the way so as to free both elongated member 4 when said mechanical member 80 will be raised again, then locking both working ends 30 into said ballast inspection holes again, resulting in lifting the whole tie 60 and so on as viewed in FIG. 12. One aspect of the present embodiment allows for the replacement of the above-mentioned vertical elongated member 82 by an actuator, such as actuator 72 described further down in relation to FIG. 14, to execute the lowering and raising of the working end 30 for the engagement and disengagement of the said working end.

Figure 14:
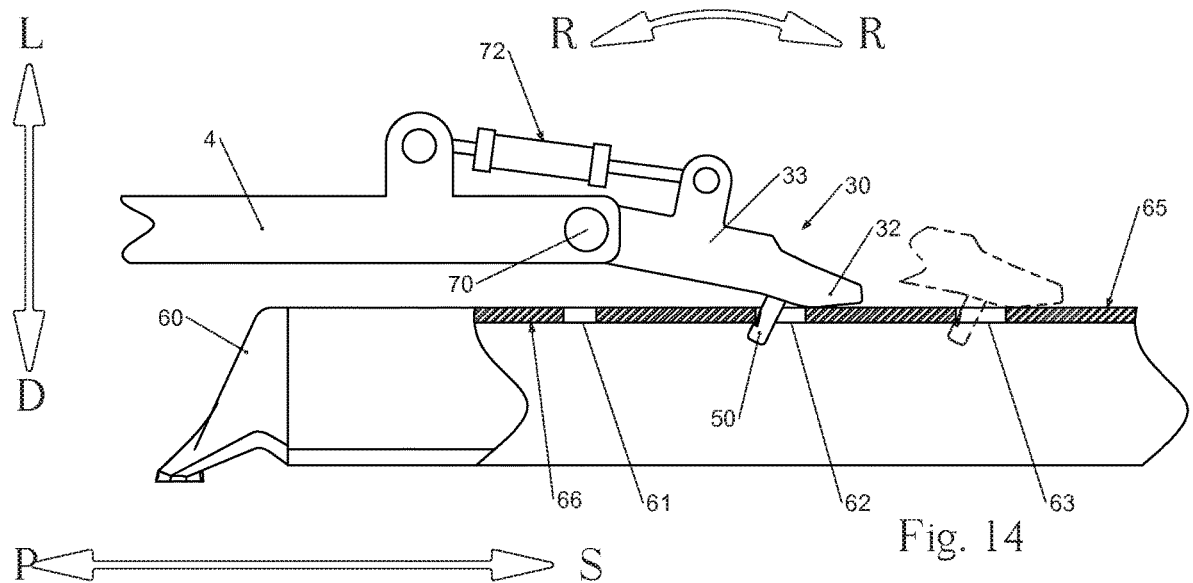
FIG. 14 is a partial sectional side elevation view of another embodiment of the present invention where the working end is coupled to an alternate member meant to be further integrated into a tie inserting and extracting machine.

Again another embodiment is presented in FIG. 14. The working 30 introduced in the description of the other embodiments related to FIGS. 10 to 13, has its section 33 still coupled to elongated member 4 by same horizontal pivoting member 70. This time said elongated member remains straight. A small pneumatic, hydraulic or electrical actuator 72 allows the lowering and raising of working end 30 for engagement and disengagement of engagement member 50 of said working end. The present alternate embodiment is to be further attached or integrated into a tie inserting and extracting machine by connecting elongated member 4 into the rest of said machine. Said machine is sitting directly on the railway under maintenance and extracts old ties 60 from under the rails then inserts new ties by sliding them horizontally, directly under the existing already in place rails. Said machine generally has a kind of clamping apparatus that grasps the tie under operation and is adapted for wood ties but, most of the time, cannot hold a steel tie in the right position and solidly enough to perform the required sliding movement. The present embodiment replaces that said clamping apparatus. For insertion of a new steel tie for example, the said tie is laying down on the ground perpendicularly to the rails, on either side of the railway, the machine moves its working end 30, by horizontally extending or retracting its member 4, above a conveniently located hole of its choice whether a ballast inspection hole 61 or 64 or rail clamp holes 62 or 63 (See FIG. 3 for complete holes location on tie 60) then lowers the working end 30 with actuator 72 and locks it by lifting (L) a bit its elongated member 4 and pulls (P) towards itself, thus towards the rails, and sometimes pushes (S) if stuck then pulls (P) again to perform the sliding under the rail. Once the working end 30 reaches the rail and cannot go further in, the machine disengages said working end by raising said working end with actuator 72, extends its elongated member 4 and reinserts said working end into a farther rail clamp holes 62 or 63 or ballast inspection hole 61 or 64 and pulls again to continue the sliding under the rail. The machine thus step from one hole to the other until the tie under operation is closed to its final position, then, the only suitable hole left is a ballast inspection 61, the last one closer to the end of the tie. Final positioning can occur with the working end 30 using that said last hole. Since the tie under operation is pulled and thus has to slide on uneven ground, a great deal of friction might be encountered. The use of this type of working end 30 provides an easy hooking mechanism that cannot slip as opposed to more sturdy and elaborate clamp type one. Because of its design, same said working end allows the possibility of simultaneously lifting the tie a little while pulling to lessen friction on the ground when required.

Figure 15:
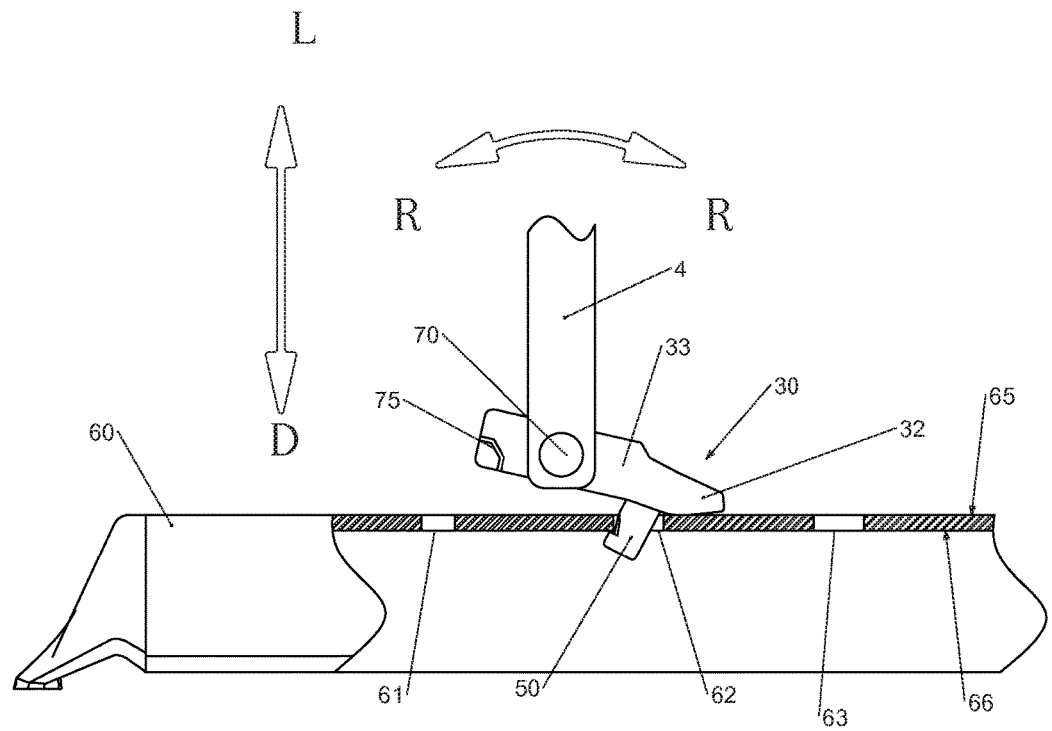
FIG. 15 is a partial sectional side elevation view of another embodiment of the present invention where working end of the present invention is coupled to a vertical member meant to be further integrated in the articulated arm of mobile backhoe, charger or excavator type machines for purposes of lifting and moving tie or stack of ties.

Still another embodiment can be seen in FIG. 15. The Working end 30, described in previous embodiments, is connected to same pivoting member 70 while said pivoting member allows the coupling with an elongated member 4 naturally used vertically. Said elongated member is meant to be further attached or integrated in a mobile transporter such as a backhoe, a loader, an excavator or the likes. This embodiment offers the possibility of having the whole apparatus just being described, sized a bit larger than the previously discussed embodiment of the same components because it can be inserted in any larger rail clamp adapter holes 62 or 63 (see FIG. 3 for complete holes location on tie 60). Being larger results in being stronger so this embodiment can lift a whole stack of ties, since they are all usually strapped together, by inserting its engagement member 50 of working end 30 in the chosen hole of the top tie of the stack. Once done, just lifting (L) the vertical member 4 will tilt said working end thus locking itself into the hole. Ties can then be moved anywhere. Disengaging said working end is done simply by lowering elongated member 4, which will be done naturally once the machine deposited the ties where it is intended, then performing a small rotation R until said elongated member reaches stopper 75. Continuing a bit the rotation R will tilt the engagement member 50 out of the hole so the working end 30 can be lifted above the tie by lifting the elongated member 4 again. A person skilled in the art can choose not to oversize the said working end in order to maintain the capability of inserting said working end in every holes even the smaller diameter ballast inspection hole 61 or 64 (see FIG. 3 for complete holes location on tie 60). But attention should paid to the strength of smaller engagement member 50 if lifting a whole stack of ties is considered. One aspect of the present embodiment allows the use of an actuator, as described in FIG. 14, to execute the lowering and raising of the working end 30 for the engagement and disengagement of the said working end.

While illustrative and presently preferred and alternate embodiments of the invention have been described in detail hereinabove, it is to be understood that the inventive concepts may be otherwise variously embodied and employed and that the appended claims are intended to be construed to include such variations except insofar as limited by the prior art.

The invention claimed is:

1. A device for lifting and handling a tie, said device comprising:
   a working end comprising:
      a first end;
      a second end, the second end comprising:
         an underneath surface adapted to contact with a top surface of the tie;

a tip portion sharing the underneath surface;
a heel fixedly attached to the first end and to the second end, the heel defining a first angle between the first end and the second end;
the working end being tiltable in a first direction about a horizontal axis perpendicular to a longitudinal axis of the working end, the first direction being defined by the first end moving toward the top surface of the tie;
the working end further comprising an engagement member comprising a recess facing away from the second end, the engagement member being fixedly attached to the working end between the heel and the tip portion and projecting at a second fixed angle directly from the underneath surface of the second end, the engagement member being adapted to
be inserted perpendicular to the top surface of the tie into one of a plurality of holes located on the top surface of the tie after the working end is tilted in the first direction; and
the working end being tiltable about a horizontal axis perpendicular to a longitudinal axis of the engagement member in a second direction being opposite to the first direction once the engagement member is inserted into the tie hole, the angle of tilting in the second direction being limited by the underneath surface of the tip portion contacting against the top surface of the tie and being limited by the recess being hooked to an under and outer edge portion of the tie hole being the closest to the first end.

2. The device for lifting and handling a tie as described in claim 1, wherein the recess is a notch.

3. The device for lifting and handling a tie as described in claim 1, wherein the device comprises a mechanical member attached to the first end of the working end, the working end projecting from the mechanical member.

4. The device for lifting and handling a tie as described in claim 3, wherein the mechanical member is an elongated member and wherein the device comprises a handle affixed to the elongated member.

5. The device for lifting and handling a tie as described in claim 1 wherein the first angle is comprised between 110 and 160 degrees.

6. The device for lifting and handling a tie as described in claim 1, wherein the device comprises a mechanical member pivotally attached to the first end of the working end.

7. The device for lifting and handling a tie as described in claim 6, wherein the mechanical member is an elongated member having an angular shape towards one end, the one end pivotally attached to the first end of the working end and said elongated member acting as a pinch bar.

8. The device for lifting and handling a tie as described in claim 6, wherein the mechanical member is attached to a machine.

9. The device for lifting and handling a tie as described in claim 8, wherein the machine is selected from the group of a machine for inserting and extracting ties, a tie laying machine, a mobile backhoe type machine, a mobile loader type machine or a mobile hydraulic excavator type machine.

10. The device for lifting and handling a tie as described in claim 9, wherein the device comprises at least one actuator allowing the lowering and raising of the said working end with respect to the mechanical member.

11. The device for lifting and handling a tie as described in claim 6, wherein the mechanical member is integrated to a machine.

12. The device for lifting and handling a tie as described in claim 11, wherein the machine is selected from the group of a machine for inserting and extracting ties, a tie laying machine, a mobile backhoe type machine, a mobile loader type machine or a mobile hydraulic excavator type machine.

13. The device for lifting and handling a tie as described in claim 12, wherein the device comprises at least one actuator allowing the lowering and raising of the said working end with respect to said mechanical member.

14. The device for lifting and handling a tie as described in claim 1, wherein the working end is made of steel.

15. The device for lifting and handling a tie as described in claim 1, wherein the engagement member is made of material to resist continuous friction and abrasion against the outer edge of the tie hole.

16. The device for lifting and handling a tie as described in claim 4, wherein said elongated member and said handle are made of rigid material yet light material.

17. The device for lifting and handling a tie as described in claim 1, the second angle between the engagement member and the underneath surface of the tip portion being more than 90 degrees.

18. A device for lifting and handling a tie, said device comprising:
a mechanical member;
at least two working ends, each working end comprising:
a first end pivotally attached to the mechanical member; and
a second end comprising:
an underneath surface adapted to contact with a top surface of the tie;
a tip portion sharing the underneath surface;
an engagement member being fixedly attached to the working end and projecting at an angle directly from the second end, the engagement member being adapted to:
be inserted perpendicular to the top surface of the tie into one or more hole located on the top surface of the tie when the first end is tilted in a first direction toward the top surface of the tie;
be tilted after the tip portion is tilted in a second direction, opposite to the first direction, the angle of tilting in the second direction being limited by the underneath surface of the tip portion contacting against the top surface of the tie and by the engagement member contacting an under and outer edge portion of the tie hole being the closest to the first end;
the engagement member comprising a recess shaped to hook a portion of an under and outer edge of the tie hole being the closest to the first end when the second end is tilted in the second direction.

19. The device for lifting and handling a tie as described in claim 18, wherein the recess is a notch.

20. The device for lifting and handling a tie as described in claim 18, wherein the device comprises at least one actuator allowing the lowering and raising of at least one of the working ends with respect to the mechanical member.

21. The device for lifting and handling a tie as described in claim 20, wherein the mechanical member is attached to a machine.

22. The device for lifting and handling a tie as described in claim 21, wherein the machine is selected from the group of a machine for inserting and extracting ties, a tie laying machine, a mobile backhoe type machine, a mobile loader type machine or a mobile hydraulic excavator type machine.

23. The device for lifting and handling a tie as described in claim 18, the angle between the engagement member and the underneath surface of the tip portion being more than 90 degrees.

24. A method for lifting and handling a steel railway tie on an underlying surface using a device, the method comprising:
    pivoting a working end of the device in a first direction about a horizontal axis perpendicular to a longitudinal axis of the working end to position an engagement member perpendicular to a top surface of the steel railway tie, the engagement member comprising a recess facing away from the second end, the engagement member being fixedly attached to the working end between a heel and tip portion and projecting at a fixed angle directly from a bottom surface of a working end of the device;
    inserting the positioned engagement member into one of a plurality of holes of the steel railway tie:
    once the engagement member is inserted, contacting an underneath surface of the end of the working end to rest against the top surface of the steel railway tie;
    with the underneath surface resting against the top surface of the steel railway tie, tilting the working end of the device about a horizontal axis perpendicular to a longitudinal axis of the engagement member in a second direction, opposite to the first direction, until the end of the working end directly contacts the top surface of the steel railway tie and a recess of the engagement member is hooked to an under and outer edge portion of the steel railway tie hole being the closest to the first end of the working end; and with the engagement member hooked to the under and outer edge portion of the steel railway tie hole, lifting the device off the underlying surface to lift at least a portion of the steel railway tie.

25. The method for lifting and handling a steel railway tie as described in claim 24, wherein the lifting of the working end further comprises one or more of the followings steps:
    pulling the device to move the steel railway tie along a longitudinal axis of the steel railway tie;
    pushing the device to move the steel railway tie along the longitudinal axis of the steel railway tie;
    rotating the device to rotate the steel railway tie along the longitudinal axis of the steel railway tie.

26. The method for lifting and handling a steel railway tie as described in claim 25, wherein any of the one or more steps is performed by a machine.

27. The method for lifting and handling a steel railway tie as described in claim 24, the method comprising:
    rotating the working end to be positioned perpendicular to the longitudinal axis of the steel railway tie; and
    rotating the device to rotate the steel railway tie along the longitudinal axis of the steel railway tie.

28. The method for lifting and handling a steel railway tie as described in claim 27, the method comprising gravity freeing the engagement member of the steel railway tie hole during the rotation of the device to rotate the steel railway tie.

\* \* \* \* \*